H. C. HARBRIDGE.
MEASURE.
APPLICATION FILED DEC. 24, 1909.

960,906.

Patented June 7, 1910.

WITNESSES:
William P. Goebel.

INVENTOR
Herbert C. Harbridge
BY Munn & Co
ATTORNEYS

UNITED STATES PATENT OFFICE.

HERBERT C. HARBRIDGE, OF MARGO, SASKATCHEWAN, CANADA.

MEASURE.

960,906.  Specification of Letters Patent.  Patented June 7, 1910.

Application filed December 24, 1909. Serial No. 534,754.

*To all whom it may concern:*

Be it known that I, HERBERT C. HARBRIDGE, a subject of the King of Great Britain, and a resident of Margo, in the Province of Saskatchewan and Dominion of Canada, have invented a new and Improved Measure, of which the following is a full, clear, and exact description.

The invention is an improvement in that class of dry or liquid measures which is constructed of one or more sections adjustably received one within the other, whereby the capacity of the measure may be varied.

The invention contemplates a measure having the upper section screw-threaded in the lower section and graduated at the side, with the zero arranged intermediate its length, and extending upwardly to the top or point of full measure, the capacity of the lower section being a multiple of the capacity of the upper graduated portion of the upper section.

Reference is to be had to the accompanying drawings forming a part of this specification, in which similar characters of reference indicate corresponding parts in both views.

Figure 1:
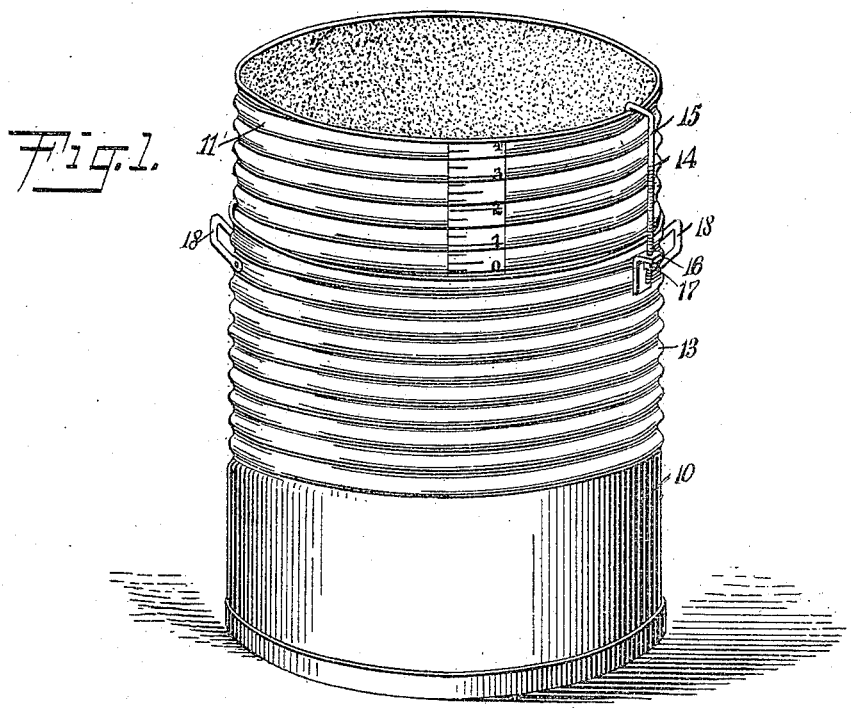
Figure 2:
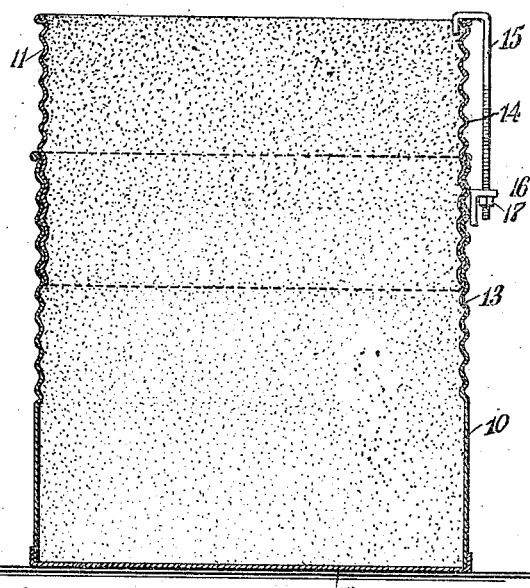

Figure 1 is a perspective view of a measure constructed in accordance with my invention; and Fig. 2 is a central vertical section of the same.

In some sections of the country, many products, especially grain, are sold by the bushel of a certain number of pounds, thus, for example, thirty-four pounds of oats are sold for one bushel, but the weight per volume of oats varies between thirty-two pounds and forty-five pounds to the bushel, so that the ordinary bushel measure is of little value in arriving at the correct weight. To meet these conditions I have provided a measure which is adjustable to hold either a greater or lesser quantity than the actual bushel or other prescribed unit.

The measure comprises a lower measure section 10 and an upper measure section 11, the lower measure section having a bottom 12 and is spirally corrugated from the top for about two-thirds its length to provide screw threads 13, and the upper section is likewise threaded for its full length as indicated at 14, and is of a diameter to screw into the lower section. The side of the upper section is graduated, with the zero of the graduation arranged intermediate the length of the upper section, and from which point the graduations extend upwardly to the top or point of full measure, this upper graduated portion of the upper section having a capacity equal to the capacity of an equal division of the lower section, and when the measure is adjusted to the zero mark generally represents one-quarter of a bushel. The diameter of the measure is preferably such that when the graduations are in inches and quarter inches, as shown, each quarter inch will represent one pint capacity of the measure; accordingly, the entire upper graduated portion when of four inches, as shown, represents a capacity of one peck.

For locking the two sections of the measure together in any position of adjustment I provide a hook 15 which engages over the top edge of the upper measure section and has a screw-threaded shank passing through an ear 16 fixed to the side of the bottom section and major portion of the measure, the shank of the hook having a nut 17 threaded thereon and bearing against the under side of the ear 16 to draw the sections of the measure together and bindingly engage the threads. The lower section of the measure is provided at opposite sides near the top with handles 18, and, as shown in Fig. 1, the upper edge thereof serves as an index member for the scale of the upper section, which scale passes within the lower section when the upper section is screwed inwardly, the upper section passing a substantial distance within the lower section when the upper edge of the latter is at the zero mark, in order to insure a firm connection between the two measure sections.

With the measure thus constructed, when it is desired to measure a legal bushel or other quantity of a prescribed number of pounds, the required number of pounds of the grain or produce which is to be measured is first weighed out and then placed within the measure, after which the latter is adjusted until the grain or produce stands even with the top. The sections of the measure are then locked together and the measure serves as a scale for the measurement of the entire output of the products.

As many farmers do not possess scales, the measure is particularly adapted to their use.

Having thus described my invention, I claim as new and desire to secure by Letters Patent:

1. The combination in a measure, of a lower measure section having a bottom and an upper measure section screwed into the lower measure section and adapted to stand thereabove any distance within the limits of the length of the upper section and having a graduated portion extended to the top, with the zero of the graduations arranged intermediate the length of the upper section, and with the capacity of the lower section of the measure a common multiple of the capacity of that portion of the upper section of the measure extending above the zero mark.

2. The combination in a measure, of a lower measure section, an upper measure section, the two sections adjustably threaded together, and means to lock the sections in adjusted position, arranged to tend to force the upper measure section within the lower measure section.

3. The combination in a measure, of a lower measure section having a bottom, an upper measure section having a threaded connection with the lower measure section, adapting the height of the measure to be extended and contracted, an ear attached to the lower measure section, a hook engaging over the upper edge of the upper measure section and having a threaded shank extending through said ear, and a nut threaded on the shank of the hook and bearing on the under side of the ear.

In testimony whereof I have signed my name to this specification in the presence of two subscribing witnesses.

HERBERT C. HARBRIDGE.

Witnesses:
G. H. DEVITT,
J. H. BARTLEY.